United States Patent [19]

Tokuyama et al.

[11] Patent Number: 4,578,730

[45] Date of Patent: Mar. 25, 1986

[54] HIGH-VOLTAGE DC CIRCUIT BREAKER APPARATUS

[75] Inventors: Shunji Tokuyama, Hitachi; Kooji Suzuki, Takahagi; Kunio Hirasawa, Hitachi; Yoshio Yoshioka, Hitachi; Keiji Arimatsu, Hitachi, all of Japan

[73] Assignee: Hitachi, Ltd., Tokyo, Japan

[21] Appl. No.: 541,245

[22] Filed: Oct. 12, 1983

[30] Foreign Application Priority Data

Oct. 13, 1982 [JP] Japan ................................ 57-178351

[51] Int. Cl.[4] ................................................ H02H 3/00

[52] U.S. Cl. ........................................... 361/4; 361/7; 361/8; 361/14; 361/15; 307/126; 200/144 B; 200/146 AA

[58] Field of Search .......................... 361/4, 2, 6, 7, 13, 361/14, 15, 16, 8; 307/134, 135, 137, 125, 126; 200/144 R, 144 B, 145, 146, 146 AA

[56] References Cited

U.S. PATENT DOCUMENTS

| | | | |
|---|---|---|---|
| 3,879,647 | 4/1975 | Hamilton et al. | 363/49 X |
| 4,172,268 | 10/1979 | Yanabu et al. | 361/4 |
| 4,180,852 | 12/1979 | Koizumi et al. | 363/49 |
| 4,442,469 | 4/1984 | Yanabu et al. | 361/4 |

OTHER PUBLICATIONS

"Theory and Application of the Commutation Principle for H.V.D.C. Circuit Breakers" by A. N. Greenwood, et al.; I.E.E.E. PAS vol. 91, No. 4, 1972 pp. 1570–1574.

*Primary Examiner*—Harry E. Moose, Jr.
*Assistant Examiner*—Derek S. Jennings
*Attorney, Agent, or Firm*—Antonelli, Terry & Wands

[57] ABSTRACT

There is disclosed a high-voltage DC circuit breaker apparatus with reverse current insertion system by line voltage charge, which comprises a commutation switch, a series circuit of a capacitor, a reactor and a switch connected in parallel with the commutation switch, a resistor connected so as to charge the capacitor by a line voltage. The charging time constant of the capacitor determined by the capacity of the capacitor and the resistor is used as a reference in a manner so that the rise time constant of the line voltage is smaller than the charging time constant of the capacitor, and the rise time constant of the line current is larger than the charging time constant of the capacitor, thereby interrupting the fault current without fail.

4 Claims, 7 Drawing Figures

HIGH-VOLTAGE DC CIRCUIT BREAKER APPARATUS

The present invention relates to a control and protection system for a high-voltage DC transmission system, or more in particular to a high-voltage DC circuit breaker apparatus with reverse current insertion system by line voltage charge.

A direct current, which lacks a natural zero current point of time unlike an alternating current, is required to be provided with a zero current point of time produced by some means. Such means is generally classified into a current-limiting method and an oscillating current method. The present invention, which belongs to the latter, relates to a reverse current insertion system in which a zero current point of time is forcibly provided by use of a charged capacitor.

A conventional high-voltage DC circuit breaker apparatus with reverse current insertion system is shown in FIG. 1, and examples of waveforms obtained at the time of an interrupting operation are shown in FIG. 2. In FIG. 1, reference numeral 10 designates a high-voltage DC circuit breaker apparatus including a commutation switch CB, a series circuit of a capacitor C, a reactor L and a switch S, which is connected in parallel with the commutation switch CB, and also a non-linear resistor connected in parallel therewith and comprising zinc oxide ZnO as a main component. The capacitor C is connected at one end to an input terminal 3 of a high-voltage DC circuit breaker apparatus 10 and at the other end to the switch S through the reactor L, and the switch S is connected at the other end to an output terminal 4 of the high-voltage DC circuit breaker apparatus 10, and the capacitor C is kept charged normally at the charge voltage value of Vc by a charger 2 connected across the capacitor C, and the input terminal 3 of the high-voltage DC circuit breaker apparatus 10 is supplied with a line voltage E through a DC reactor DCL from a DC power source, and a line current $I_{DC}$ flows through the high-voltage DC circuit breaker apparatus 10. In the case of interrupting the line current $I_{DC}$ due to a ground fault of the line 1 connected at one end to the output terminal 4 of the high-voltage DC circuit breaker apparatus 10 or the like, the commutation switch CB is opened by a ground fault signal (not shown), and then the switch S is closed at a time point $t_1$, so that an oscillating current Ic dependent on LC is superposed on the line current $I_{DC}$ and a resultant current indicated by curve II flows into the commutation switch CB, where $I_p$ represents the crest value of the oscillating current $I_c$. In this case, if the crest value $I_p$ is larger than the line current $I_{DC}$ (or $I_{DC}<I_p$), a zero current point of time will occur and therefore the line current $I_{DC}$ flowing through the commutation switch CB is interrupted at a time point $t_2$. The breaking operation of the commutation switch CB causes the line current $I_{DC}$ to commutate to the capacitor C, so that the line voltage E applied between the electrodes of the commutation switch CB becomes a voltage as shown by curve I. When this voltage exceeds a voltage level Vt, the non-linear resistor ZnO steeply conducts, so that a current as shown by curve III flows through the non-linear resistor ZnO and the line voltage E is limited to the voltage level Vt as shown by curve I. The energy stored in the DC reactor DCL is absorbed by the non-linear resistor ZnO, and the line current $I_{DC}$ is limited and then interrupted at a time point $t_3$. After interruption, a restoration voltage Vr remains between the electrodes of the commutation switch CB. However, in the case where the energy stored in the DC reactor DCL is small, the non-linear resistor ZnO is not required.

The reverse current insertion system has such an advantage that since the zero current point of time is produced forcibly by utilization of the pre-charged voltage of a capacitor, the line current $I_{DC}$ flowing through the commutation switch CB can be cut off without fail. In view of the magnitude of the current $I_P$ represented by $I_p=V_C/\sqrt{L/C}$, where the values of the reactor L and capacitor C are selected in accordance with the commutation capability of the commutation switch CB, it is possible to obtain a charge voltage value $V_C$ capable of always satisfying the relation $I_{DC}<I_P$ that is the condition for interruption. In the presence of a charger 2, there is such an advantage that it is always possible to secure the charge voltage $V_C$ required for interruption. However, there is such a drawback that the cost of the charger becomes enormous in accordance with an increase of the line voltage E. As a result, a method is under study in which the charger 2 is not required but the line voltage E is used instead in order to obtain an economical high-voltage DC circuit breaker apparatus. In this case, the charge voltage $V_C$ of the capacitor is influenced by the line voltage E. In the event that the line voltage E is low at the time of controlling whole-start operation in which all the stopped converters, i.e. the stopped rectifier Rec and inverter Inv are started, a charge voltage $V_C$ necessary for interruption cannot be secured, and the resulting lack of capability of interruption leads to such a drawback that the protection of the transmission system cannot be achieved.

The object of the present invention is to provide an economical high-voltage DC circuit breaker apparatus which is capable of control and protection of a high-voltage DC transmission system without fail.

According to the present invention, there is provided a high-voltage DC circuit breaker apparatus with reverse current insertion system by line voltage charge, comprising a commutation switch, a series circuit of a capacitor, a reactor and a switch connected in parallel with the commutation switch, and a resistor connected so as to charge the capacitor by the line voltage, the rise time constant of the line voltage being made smaller than the charging time constant of the capacitor determined by the capacity of the capacitor and the resistance value of the resistor, and the rise time constant of the line current being made larger than the charging time constant of the capacitor.

The above and other objects, features and advantages of the present invention will be apparent from the following detailed description of the preferred embodiments of the invention in conjunction with the accompanying drawings, in which.

To facilitate the understanding of the present invention, the control of whole-start operation of a high-voltage DC transmission system will be explained with reference to FIGS. 3 and 4 prior to the explanation of the embodiment of the present invention.

Figure 3:
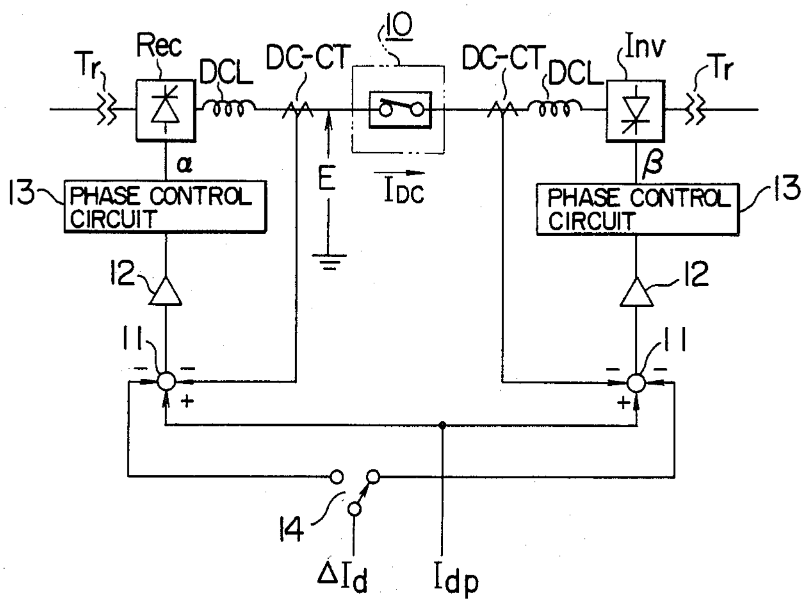
FIG. 3 is a schematic circuit diagram for explaining a high-voltage DC transmission system.

Referring to FIG. 3, a high-voltage DC transmission system includes a converter transformer Tr, a rectifier Rec, a DC reactor DCL, an inverter Inv, and a high-voltage DC circuit breaker apparatus 10. The control unit for each of converters, i.e. the rectifier Rec and the inverter Inv includes a DC current transformer DC-CT, a comparator 11, an amplifier 12 and a phase control circuit 13. On the other hand, the comparator 11 is supplied with a current setting Idp and a current margin ΔId from a current margin charge-over switch 14.

For the control of whole-start operation of the high-voltage DC transmission system, the control angles $\alpha$ and $\beta$ are both set at substantially 90° to start the rectifier Rec and the inverter Inv. When the control angles $\alpha$ and $\beta$ are both set at 90°, the output voltages of the rectifier Rec and the inverter Inv are almost zero. Then, by increasing the current setting Idp, the DC current is led to a target value.

Figure 4:
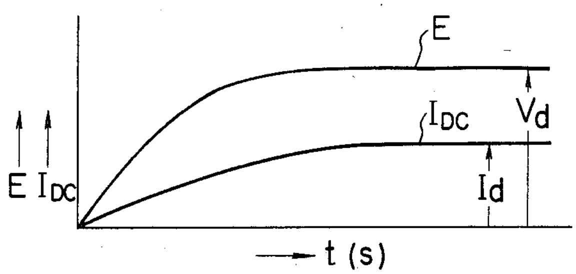
FIG. 4 shows voltage and current waveforms for explaining the control of the whole-start operation of the high-voltage DC transmission system shown in FIG. 3.

During the starting period of time of the high-voltage DC transmission system, a voltage E and a current $I_{DC}$ of the high-voltage DC transmission system gradually rise as shown in FIG. 4. Generally, it takes several hundred milliseconds until the line voltage E and current $I_{DC}$ reach a rated voltage $V_d$ and a rated current $I_d$ at completion of starting operation, respectively. This is to prevent a surge current which otherwise might be caused by the system inductance, or mainly the reactance of the DC reactor DCL and the line capacitance existing between the line and the earth. The starting operation mode of this type is called soft start.

The rise time constant of the line current $I_{DC}$ is determined from the rise time constant of the current setting Idp and the time constant depending on the reactance of DC reactor DCL and the resistance in the transmission system. Although the circuit constants of the transmission system are not adjustable at will, the time constant of the current setting Idp can be easily changed by adjusting the electronic circuit constants of the control unit.

Figure 1:
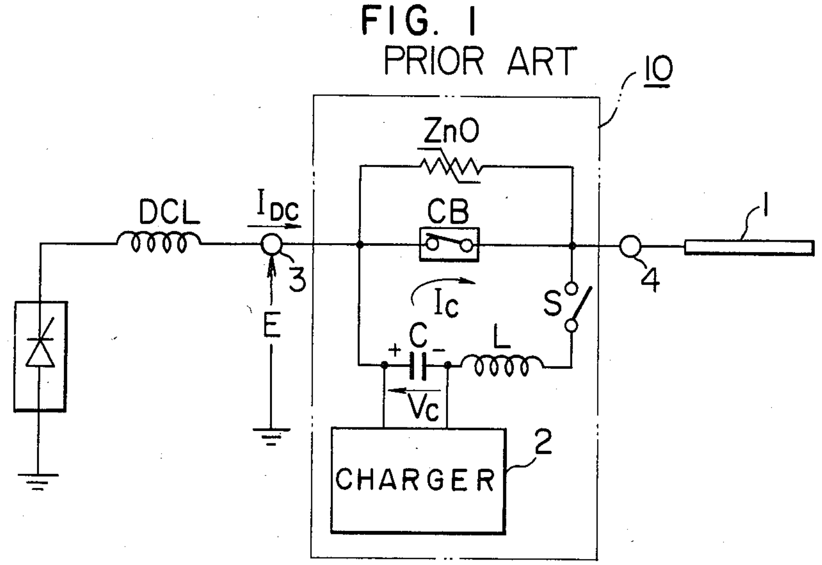
FIG. 1 PRIOR ART
FIG. 1 is a schematic circuit diagram of a conventional high-voltage DC circuit breaker apparatus with reverse current insertion system.
Figure 2:
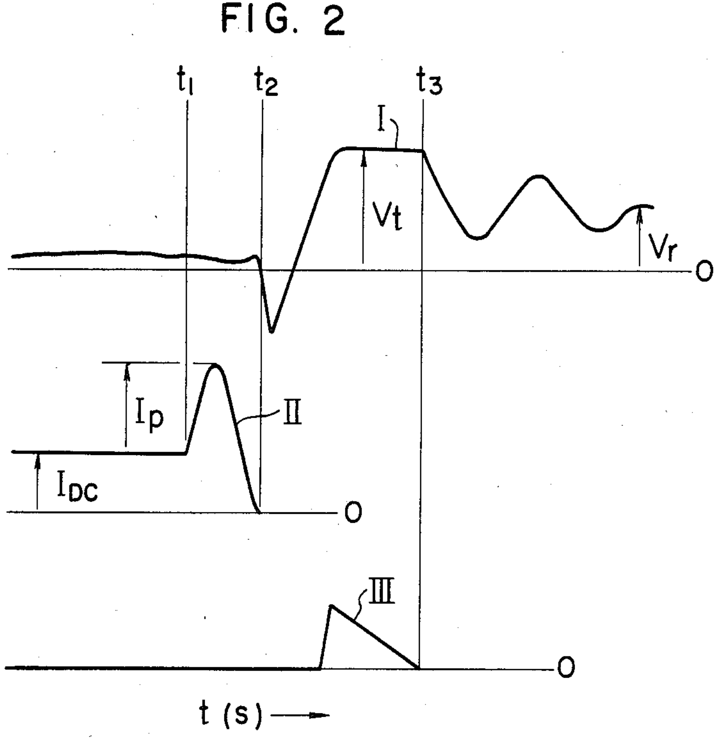
FIG. 2 shows waveforms of voltage and current generated at the time of interrupting operation of a high-voltage DC circuit breaker apparatus with reverse current insertion system.
Figure 5:
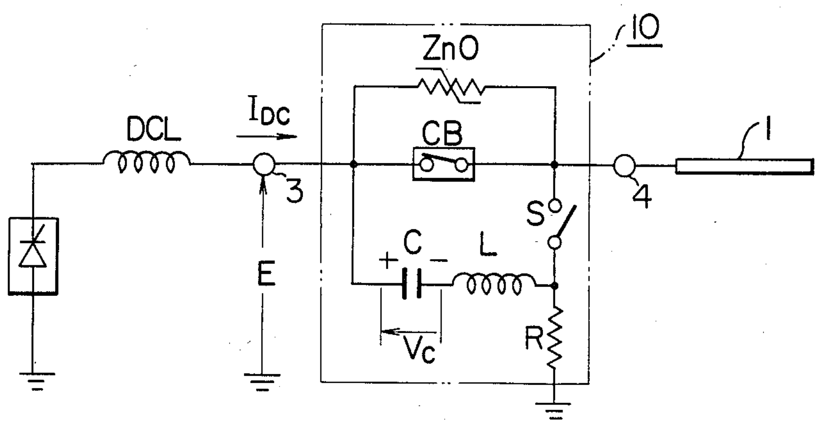
FIG. 5 is a schematic circuit diagram showing an embodiment of the high-voltage DC circuit breaker apparatus with reverse current insertion system according to the present invention.
Figure 6:
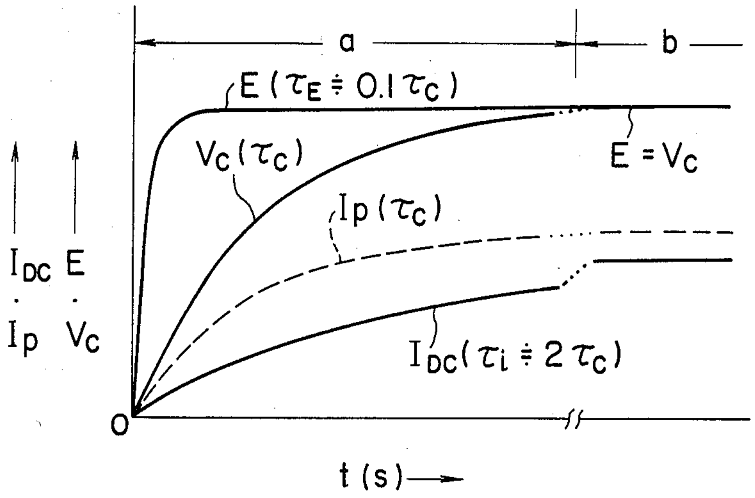
FIG. 6 shows voltage and current waveforms for explaining the control of whole-start operation of an embodiment according to the present invention shown in FIG. 5.

An embodiment of the present invention will be explained below. FIG. 5 shows an example of circuit arrangement using a DC circuit breaker apparatus with reverse current insertion system by line voltage charge according to the present invention. Those component elements having the same functions as those of the prior art are designated by the same reference numerals and characters as described in the prior art. In this embodiment, the commutation switch CB, the series circuit of the capacitor C, the reactor L, and the switch S, and the non-linear resistor ZnO are connected in parallel with each other, as already explained with reference to FIG. 1, and the charger 2 of the conventional system is replaced by a charging resistor R connected between the earth and the junctions of the reactor L and the switch S, through which resistor R the commutating capacitor C is kept charged by the line voltage E. Examples of voltage and current waveforms produced at the time of whole-start operation according to the present invention are shown in FIG. 6. At the time of whole-start operation, the foregoing control system called soft start is employed in the embodiment of the present invention as well, thereby to prevent generation of an abnormal voltage. In this case, the rise time constant of the line voltage E and the line current $I_{DC}$ are capable of being adjusted by the control unit, and therefore, according to the present invention, the time constants of the line voltage E and the line current $I_{DC}$ are adjusted on the basis of the charging time constant of the commutating capacitor C. The commutating capacitor C is charged in accordance with the time constant $\tau_c$ of $C \times R$ by the line voltage E. The time constant $\tau_c$ is determined at a value which makes it feasible to prevent the charge voltage Vc from being reduced due to a ground fault that may occur during the whole-start operation. In this embodiment, the time constant $\tau_c$ is approximately 0.5 to 1 second. Consequently, the time constant $\tau_E$ of the line voltage E is set at about one-tenth of the time constant $\tau_c$. As explained with reference to the prior art, the crest value Ip of the oscillating current $I_C$ is proportional to the charge voltage $V_C$, so that the crest value Ip increases in accordance with the time constant $\tau_c$. Since the relation between the line current $I_{DC}$ and crest value Ip is required to be such that $I_{DC} < Ip$, the rise time constant $\tau_i$ of the line current $I_{DC}$ is set at approximately $2\tau_c$ inclusive of a margin. The time range a in FIG. 6 shows the state of the whole-start operation, and the time range b shows the steady state of the operation. The high-voltage DC circuit breaker apparatus 10 in which the relation $I_{DC} < Ip$ is always maintained so as to provide the interrupting conditions of the commutation switch CB, is capable of interrupting the fault current without fail, thereby providing the reliable protection of the DC transmission system.

Figure 7:
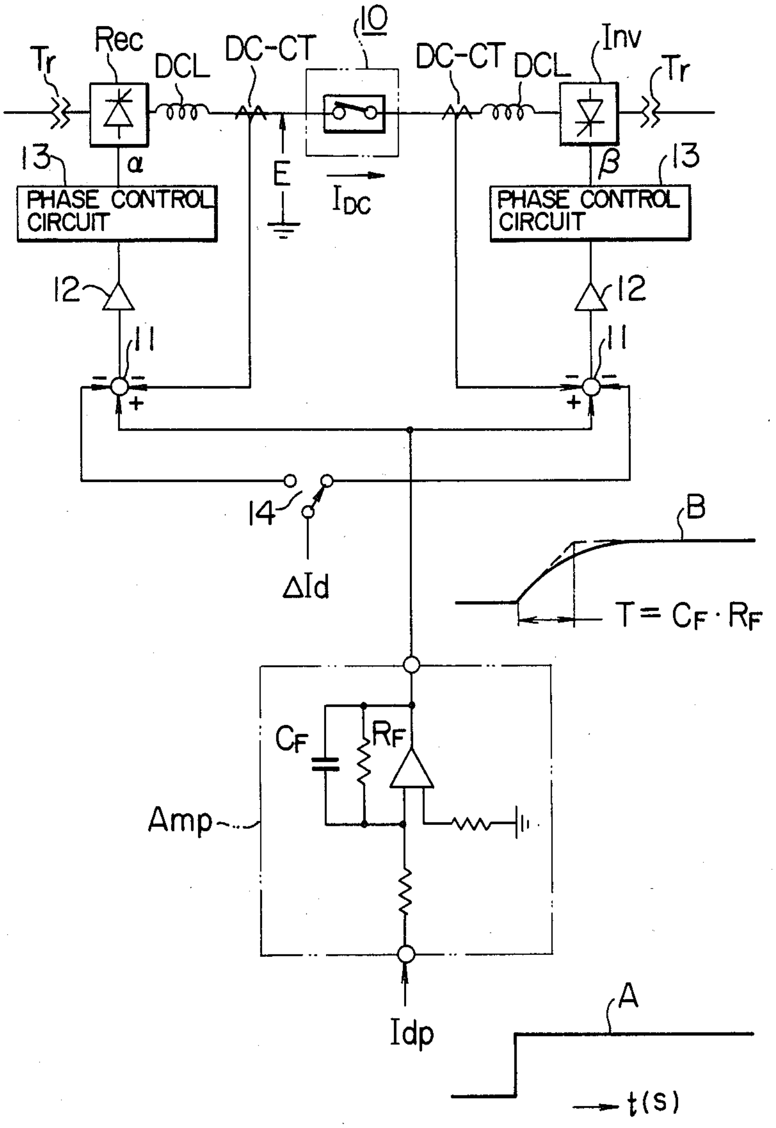
FIG. 7 is a schematic circuit diagram for explaining the control system of the converters according to the present invention.

Next, referring to FIG. 7, we will explain below the control unit for each of converters, i.e. the rectifier Rec and the inverter Inv according to the present invention. An operational amplifier with time lag of first order is inserted between an external current setting source and a comparator 11. If the current setting value Idp applied to an input of the operational amplifier Amp is a step function A, an output current B of the operational amplifier Amp will have time lag of first order which rises in accordance with a time constant $T = C_F \cdot R_F$. The time constant T can be freely adjusted by changing the value of either the capacitor $C_F$ or the resistor $R_F$ so as to satisfy the condition of $C_F \cdot R_F > C \cdot R$, and besides the rise time constant of the line current $I_{DC}$ will be increased by an L component and an R component of the whole circuit.

For that reason, the rise time constant $\tau_i$ of the line current $I_{DC}$ is made much larger than the time constant T of the operational amplifier Amp so as to have the relation $\tau_i > T > \tau_c$.

It will be understood from the foregoing description that according to the present invention, there is provided a high-voltage DC circuit breaker apparatus capable of controlling and protecting the high-voltage DC transmission system without fail in view of the fact that the relation between the time constants is determined appropriately.

We claim:

1. A high-voltage DC circuit breaker apparatus with reverse current insertion system by line voltage charge comprising a commutation switch, a series circuit of a capacitor, a reactor and a switch connected in parallel with said commutation switch, a resistor for charging said capacitor, the charging time constant of said capacitor determined by the capacity of said capacitor and said resistor being used as a reference in a manner so that the rise time constant of the line voltage is smaller than the charging time constant of said capacitor, and the rise time constant of the line current is larger than the charging time constant of said capacitor, a first DC current transformer connected to one side of said commutation switch, a first DC reactor connected to said forst DC current transformer, a rectifier connected to said first DC reactor, a second DC current transformer connected to another side of said commutation switch, a second DC reactor connected to said second DC current transformer, an inverter connected to said second DC reactor, an operational amplifier for receiving a predetermined current and for outputting the predetermined current with a time lag, a current margin change-over switch for providing a current margin, a first comparator for comparing an output of said operatonal amplifier with said current margin and an output of said first DC current transformer, a first amplifier for amplifying an output of said first comparator, a first phase control circuit connected between said first amplifier and said rectifier, a second comparator for comparing the output of said operational amplifier with the current margin and output of said second DC current transformer, a second amplifier for amplifying an output of said second comparator, and a second phase control circuit connected between said second amplifier and said inverter.

2. A high-voltage DC circuit breaker apparatus with reverse current insertion system by line voltage charge according to claim 1, wherein said resistor for charging said capacitor has a value so that the rise time constant of the line voltage is smaller than the charging time constant of said capacitor determined by the capacity of said capacitor and said resistor, and the rise time constant of the line current is larger than the charging time constant of said capacitor.

3. A high-voltage DC circuit breaker apparatus switch with reverse current insertion system by line voltage charge according to claim 1, wherein said operational amplifier enables the rise time constant of said line current to be kept larger than the charging time constant of said capacitor.

4. A high-voltage DC circuit breaker apparatus with reverse current insertion system by line voltage charge according to claim 1, wherein said resistor is connected between the junction of said reactor and said switch and the earth.

* * * * *